United States Patent
Kreidler et al.

(10) Patent No.: US 9,698,645 B2
(45) Date of Patent: Jul. 4, 2017

(54) ELECTRIC MACHINE AND ASSOCIATED METHOD

(71) Applicant: Regal Beloit America, Inc., Beloit, WI (US)

(72) Inventors: Jason Jon Kreidler, Sheboygan Falls, WI (US); William Joseph Conway, Wausau, WI (US); Harold Dean Willis, Cedarburg, WI (US); Mark Lyon Klopp, Berne, IN (US); Zachary Joseph Stauffer, Fort Wayne, IN (US); Daniel Lee Elliott, West Plains, MO (US)

(73) Assignee: Regal Beloit America, Inc., Beloit, WI (US)

( * ) Notice: Subject to any disclaimer, the term of this patent is extended or adjusted under 35 U.S.C. 154(b) by 549 days.

(21) Appl. No.: 13/830,592

(22) Filed: Mar. 14, 2013

(65) Prior Publication Data

US 2014/0265673 A1    Sep. 18, 2014

(51) Int. Cl.
*H02K 5/22* (2006.01)
*H02K 15/00* (2006.01)
*H02K 3/52* (2006.01)

(52) U.S. Cl.
CPC .............. *H02K 3/522* (2013.01); *H02K 5/225* (2013.01); *H02K 15/0068* (2013.01); *Y10T 29/49009* (2015.01)

(58) Field of Classification Search
CPC ...... H02K 5/22; H02K 5/225; H02K 15/0068; H02K 3/522
USPC .............. 310/43, 71, 216.001, 216.009, 260

IPC ...................................... H02K 5/22,15/00, 3/52
See application file for complete search history.

(56) References Cited

U.S. PATENT DOCUMENTS

| | | |
|---|---|---|
| 3,873,985 A | 3/1975 | Altmayer |
| 4,351,103 A | 9/1982 | Rodenbeck |
| 4,616,149 A * | 10/1986 | Best .................. H02K 3/50 310/67 R |
| 5,044,065 A | 9/1991 | Dyke |
| 5,063,279 A | 11/1991 | Rossi |
| 5,155,403 A | 10/1992 | Dyke |
| 5,306,976 A | 4/1994 | Beckman |
| 5,765,274 A | 6/1998 | Beakes |
| 5,784,771 A | 7/1998 | Beakes et al. |
| 6,002,190 A | 12/1999 | Kieffer |
| 6,018,207 A | 1/2000 | Saban et al. |
| 6,092,276 A | 7/2000 | Beakes |
| 6,163,949 A | 12/2000 | Neuenschwander |
| 6,192,575 B1 | 2/2001 | Neuenschwander |
| 6,509,665 B1 | 1/2003 | Nishiyama et al. |
| 6,523,247 B2 | 2/2003 | Mirpuri et al. |

(Continued)

FOREIGN PATENT DOCUMENTS

| | | |
|---|---|---|
| CN | 201147863 Y | 11/2008 |
| CN | 201153223 Y | 11/2008 |

(Continued)

*Primary Examiner* — John K Kim
(74) *Attorney, Agent, or Firm* — John Wagley

(57) ABSTRACT

A member for cooperation with the stator of an electric machine and for mounting electrical connectors to the stator is provided. The member includes a body, a mounting feature and a receptacle. The mounting feature is operably associated with the body and is adapted for mounting the body onto the stator. The receptacle is operably associated with the body and is adapted for receiving at least a portion of one of the electrical connectors.

3 Claims, 9 Drawing Sheets

(56) References Cited

U.S. PATENT DOCUMENTS

| | | |
|---|---|---|
| 6,744,166 B2 | 6/2004 | Harter et al. |
| 6,847,285 B2 | 1/2005 | Sirois et al. |
| 6,984,913 B2 | 1/2006 | Neuenschwander |
| 6,991,194 B2 | 1/2006 | Stratico et al. |
| 7,062,841 B2 | 6/2006 | Neuenschwander |
| 7,086,317 B2 | 8/2006 | Bender |
| 7,111,380 B2 | 9/2006 | Sheeran et al. |
| 7,262,579 B1 | 8/2007 | Shepard |
| 7,382,075 B2 | 6/2008 | Wang et al. |
| 7,414,347 B2 * | 8/2008 | Wang ............... H02K 3/522 310/194 |
| 7,471,025 B2 | 12/2008 | Sheeran et al. |
| 7,479,725 B2 | 1/2009 | Welke et al. |
| 7,569,958 B2 | 8/2009 | Matsuzaki et al. |
| 7,578,047 B2 | 8/2009 | Wang et al. |
| 7,586,231 B2 * | 9/2009 | Wang ............... H02K 3/522 310/194 |
| 7,595,572 B2 | 9/2009 | Haga et al. |
| 7,595,578 B2 | 9/2009 | Aramaki et al. |
| 7,598,637 B2 | 10/2009 | Niehaus et al. |
| 7,615,907 B2 | 11/2009 | Fei et al. |
| 7,663,287 B2 | 2/2010 | Haga et al. |
| 7,709,992 B2 | 5/2010 | Hussey et al. |
| 7,752,733 B1 | 7/2010 | Badgerow |
| 7,821,175 B2 | 10/2010 | Ionel et al. |
| 7,965,012 B2 | 6/2011 | Murakami et al. |
| 8,018,115 B2 | 9/2011 | Lyle |
| 8,120,216 B2 | 2/2012 | Sakata |
| D660,234 S | 5/2012 | Wang et al. |
| 8,222,791 B2 | 7/2012 | Lyle |
| 8,256,094 B2 | 9/2012 | Akimoto et al. |
| 8,257,064 B2 | 9/2012 | Oota et al. |
| 8,492,948 B2 * | 7/2013 | Wang ............... H02K 3/522 310/194 |
| 2001/0006597 A1 | 7/2001 | Neuenschwander |
| 2004/0084988 A1 | 5/2004 | Sheeran et al. |
| 2004/0163232 A1 | 8/2004 | Becherucci et al. |
| 2004/0207501 A1 | 10/2004 | Souki |
| 2006/0071569 A1 | 4/2006 | Stewart et al. |
| 2007/0114877 A1 * | 5/2007 | Wang ............... H02K 1/148 310/400 |
| 2007/0188125 A1 | 8/2007 | Shepard |
| 2008/0020696 A1 | 1/2008 | Van Gansen |
| 2008/0129142 A1 | 6/2008 | Sheeran et al. |
| 2008/0179975 A1 * | 7/2008 | Kataoka ............... H02K 3/522 310/71 |
| 2009/0039729 A1 * | 2/2009 | Innami ............... B62D 5/0403 310/254.1 |
| 2009/0058206 A1 | 3/2009 | Bremmer |
| 2010/0060218 A1 * | 3/2010 | Woodward ............... H02P 6/08 318/400.15 |
| 2010/0127587 A1 | 5/2010 | Qin et al. |
| 2010/0181853 A1 | 7/2010 | Wong et al. |
| 2011/0037352 A1 | 2/2011 | Lin et al. |
| 2011/0140567 A1 | 6/2011 | Horst et al. |
| 2011/0291519 A1 | 12/2011 | Modi et al. |
| 2014/0265673 A1 * | 9/2014 | Kreidler ............... H02K 3/522 310/71 |

FOREIGN PATENT DOCUMENTS

| | | |
|---|---|---|
| CN | 101888160 A | 11/2010 |
| CN | 201781340 U | 3/2011 |
| CN | 101662177 B | 2/2012 |
| DE | 202009011270 U1 | 12/2009 |
| DE | 102011106508 A1 | 12/2012 |
| EP | 419849 B1 | 5/1994 |
| EP | 459629 B1 | 10/1995 |
| EP | 584841 B1 | 6/1999 |
| GB | 539525 A | 9/1941 |
| GB | 759652 A | 10/1956 |
| GB | 816675 A | 7/1959 |
| GB | 1438452 A | 6/1976 |
| GB | 1481928 A | 8/1977 |
| GB | 2023040 A | 12/1979 |
| JP | 11098728 A | 4/1999 |
| JP | 2007053896 A | 3/2007 |
| JP | 2008148497 A | 6/2008 |
| JP | 2012249461 A | 12/2012 |
| KR | 2009084994 A | 6/2009 |
| KR | 2010010420 A | 2/2010 |
| KR | 101002958 B1 | 12/2010 |
| SU | 702463 A1 | 12/1979 |
| WO | 9744881 A1 | 11/1997 |

\* cited by examiner

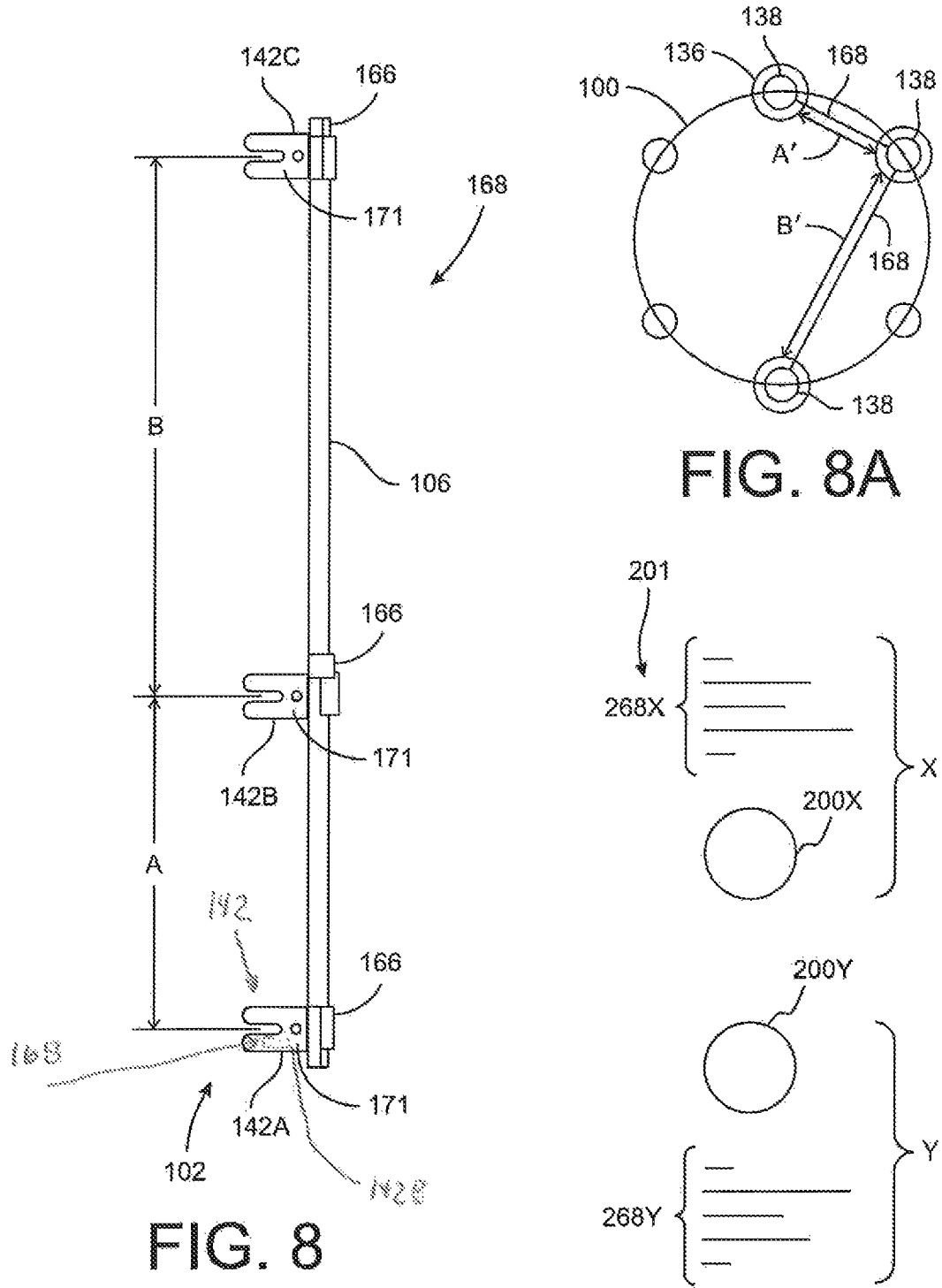

ELECTRIC MACHINE AND ASSOCIATED METHOD

BACKGROUND OF THE INVENTION

The embodiments described herein relate generally to an electric machine, and more specifically, to attaching power to stator coils associated with the electric machine.

An electric machine is typically in the form of an electric generator or an electric motor. The machine typically has a centrally located shaft that rotates relative to the machine. Electrical energy applied to coils within the motor initiates this relative motion which transfers the power to the shaft and, alternatively, mechanical energy from the relative motion of the generator excites electrical energy into the coils. For expediency the machine will be described hereinafter as a motor. It should be appreciated that a motor may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to form the winding or coil.

In an assembled configuration the coils are positioned in a spaced apart relationship about the stationary assembly that typically has a generally hollow cylindrical configuration with the coils positioned internally. The power of the electric motor is dependent on the amount of energy that may be applied to the coils and that amount of energy is proportional to the amount of wire that may be positioned about the stationary assembly. The amount of wire positioned about the stationary assembly is typically referred to as the slot fill. Placing as much wire in the coils as possible, also known as maximizing the slot fill is thus desirable.

Of many methods of manufacturing the stator and winding the wire to form the coil in particular, the following three methods are typical. The first is to form a rigid hollow cylindrical core with internal protrusions of teeth around which the coils are wound. The core is typically produced by stacking a plurality of rigid hollow laminations and joining them to form the rigid hollow cylindrical core. This method requires the wire to be fed around the teeth with a device called a needle. The need to provide for movement of the needle around the teeth limits the amount of wire that may be used to form the coil.

A second method is to similarly form a rigid hollow cylindrical core with internal protrusions of teeth and to provide spools or bobbins that may be removably secured to the teeth of the core. The coils are formed by winding wire around the bobbins while separated from the stator and then by assembling the wound bobbins onto the teeth of the stator. The separated coils provide improved access around the coil to more completely form the coil.

A third known method of manufacturing a stationary assembly includes stacking a plurality of laminations and rolling the stack to form a round stator. The laminations are stamped from a sheet of stock material and stacked to form a substantially linear array of stator sections and connecting members. The substantially linear array includes a first end and a second end. Teeth are formed along one side of the linear array. Windings may be wound on the stator sections around the teeth while the laminations are in the linear orientation in a configuration where the linear array of laminations are arched with the teeth positioned outwardly. Once the windings are positioned on the stator sections, the stack is formed into a second shape. To form the stack into the second shape, the stack is rolled around a central axis and the first end is coupled to the second end with the teeth positioned inwardly. The second shape is the substantially round shape of a stator. Typically, the second shape is maintained by securing the first end to the second end. The linear arrays provide improved access around the teeth to more completely form the coil.

As described above, it is these stator coils to which energy is applied to transform the stator coils into electro magnets that attract portions of the rotor to initiate relative motion between the rotor and the stator which transfers the power to the shaft. In order for the rotor to rotate in a particular direction the application of power to the various stator coils to transform them into electromagnets needs to occur in proper order so the energized coils cooperate with their corresponding rotor portion, called a rotor pole, to urge the rotor in that particular direction.

The selecting of energized coils can be varied such that the same physical motor may operate with a various power sources, including for example voltages of 12 Volts to 575 Volts, and in particular a 110 Volt power source, 220 Volt power source, or 440 Volt power source. Likewise the same physical motor may operate with a single phase power source or a three phase power source. Such selecting of energized coils may be determined by electrical wires that connect electrical power to the individual stators coils. These wires are typically coated or shielded with electrical insulation and are commonly called lead wires.

Thus the same physical motor (a motor with the same stator and the same rotor may operate with a 42 Volt power source, 220 Volt power source, or 440 Volt power source or a single phase power source or a three phase power source by merely changing the arrangement of the lead wires and magnet wires that connect electrical power to the individual stators coils. For low voltage operation (110 volt) the magnet wires may be the same coated wire as those used as magnet wire that is used to form the stator coils, but for higher voltage operation (440 volt) the lead wires are more heavily insulated than the coated wires used in the stator coil. The changing of the arrangement of the lead wires and magnet wires that connect electrical power to the individual stators coils may create one of several widely used electrical wiring configurations for motors that assist in providing for the use of the same physical motor for use with a single phase power source or a three phase power source or for low voltage operation or for higher voltage operation. Three of these widely used electrical wiring configurations for motors are commonly known as series, series parallel and parallel connections.

To minimize undesired electrical field and undesired magnetic interaction of the lead wires and the stator coils and to minimize power loss and lead wire cost, the lead wires are preferably precisely positioned on an and of the stator coils. The positioning of these wires requires skilled manual assembly or extremely complicated automation. Further the interior of motors, particularly those under high loads and extreme environments may have high temperature and particularly high temperatures at the coils. Since the rotor is rotating during operation at high speeds and since the motor and/or the environment may have unbalanced forces creating vibrations, having these wires properly secured in the their precise position may be very important.

For low voltage operation (110 volt) the lead wires may be the same coated wire that is used to form the stator coils, but for higher voltage operation (440 volt) the lead wires are more heavily insulated than the coated wires or magnet wire used in the stator coil. The connection of these lead wires to the coil wires needs to be secure to accommodate the environment of the motor as described above and the connections should preferably be easily performed to minimize labor and reduce chances of improper assembly. The present invention is directed to alleviate at least some of these problems with the prior art.

BRIEF DESCRIPTION OF THE INVENTION

In one aspect, a member for cooperation with the stator of an electric machine and for mounting electrical connectors to the stator is provided. The member includes a body, a mounting feature and a receptacle. The mounting feature is operably associated with the body and is adapted for mounting the body onto the stator. The receptacle is operably associated with the body and is adapted for receiving at least a portion of one of the electrical connectors.

In another aspect, an assembly for cooperation with the stator of an electric machine and to provide electrical connection to the stator is provided. The assembly includes a holder and an electrical connector. The holder has a mounting feature operably associated with the holder and adapted for mounting the holder onto the stator and a receptacle operably associated with the holder. The electrical connector is connected to the holder at the receptacle. The receptacle is adapted for receiving the electrical connector.

In another aspect, a stator for use in an electric machine is provided. The stator includes a base, a plurality of windings, a holder and an electrical connector. Each of the plurality of winding is secured to the base. The holder has a mounting feature operably associated with the holder which is adapted for mounting the holder onto the stator and a receptacle operably associated with the holder. The electrical connector is connected to the holder at the receptacle. The receptacle is adapted for receiving the electrical connector.

In yet another aspect, an electric machine is provided. The electric machine includes a housing, a rotor, and a stator. The rotor is rotatably mounted in the housing. The stator has a base, a plurality of windings, a holder, and an electrical connector. Each of the plurality of winding is secured to the base. The holder has a mounting feature operably associated with the holder and adapted for mounting the holder onto the stator. The holder also has a receptacle operably associated with the holder. The electrical connector is connected to the holder at the receptacle. The receptacle is adapted for receiving the electrical connector.

In yet another aspect, a method for assembling an electric machine is provided. The method includes providing a stator, providing a holder, providing an electrical connector, mounting the holder onto the stator, and securing the connector to the holder.

In yet another aspect, a kit to assist in connecting electrical power to an electric machine is provided. The machine has a housing, a stator including a plurality of windings, and a rotor. Each of the windings includes magnet wire. The kit has a holder, an electric connector, and a lead wire. The holder includes a mounting feature operably associated with the holder and adapted for mounting the holder onto the stator and a receptacle operably associated with the holder. The electrical connector is adapted to be connected to the holder at the receptacle. The receptacle is adapted for receiving the electrical connector and the electrical connector is adapted to be connected to the magnet wire. The lead wire is adapted to be operably connected to the electrical connector.

BRIEF DESCRIPTION OF THE DRAWINGS

FIG. 8 is a plan view of a exemplary wire assembly to be used with the exemplary stator electrical connection management device assembly of FIG. 6;

FIG. 8A is a plan view of another exemplary stator electrical connection management device assembly utilizing the lead harness of FIG. 8;

FIG. 9 is a plan view of a kit including the exemplary stator electrical connection management device assembly of FIG. 6 for conversion of an electrical machine to alternate configurations according to another embodiment of the present invention;

DETAILED DESCRIPTION OF THE INVENTION

The methods, systems, and apparatus described herein facilitate the connection of electrical power to a coil within an electric machine. Lead wire is used to connect the power source to the coils.

The selecting of energized coils can be varied such that the same physical motor may operate with a 42 Volt power source, 220 Volt power source, or 440 Volt power source or a single phase power source or a three phase power source. Thus, by merely changing the arrangement of the lead wires that connect electrical power to the individual stators coils these various power sources can be accommodated. Thus a motor may have one of many electrical configurations of lead wire.

To minimize undesired electrical field and undesired magnetic interaction of the lead wires and the stator coils and to minimize power loss and lead wire cost, the lead wires are preferably precisely positioned on an end of the stator coils. The positioning of these wires requires skilled manual assembly or extremely complicated automation. Further the interior of motors, particularly those under high loads and extreme environments may have high temperature and particularly high temperatures at the coils. Since the rotor is rotating during operation at high speeds and since the motor and/or the environment may have unbalanced forces creating vibrations, having these wires properly secured in the their precise position may be very important.

For low voltage operation (110 volt) the lead wires may be the same coated wire that is used to form the stator coils, but for high voltage operation (440 volt) the lead wires are more heavily insulated than the coated wires or magnet wire used in the stator coil. The connection of these lead wires to the coil wires needs to be secure to accommodate the environment of the motor as described above and the connections should preferably easily performed to minimize labor and reduce chances of improper assembly. The present invention is directed to alleviate at least some of these problems with the prior art.

The methods, systems, and apparatus described herein assist in the proper positioning of the lead wires and their connection to the magnet wire leads at the end of the stator motor coils. The methods, systems, and apparatus described herein may also facilitate assembly speed and accuracy. Furthermore, the methods, systems, and apparatus described herein provide for an improved appearance of the motor and its appeal to the customer.

Technical effects of the methods, systems, and apparatus described herein include at least one of improved performance and quality and reduced labor costs.

Figure 1:
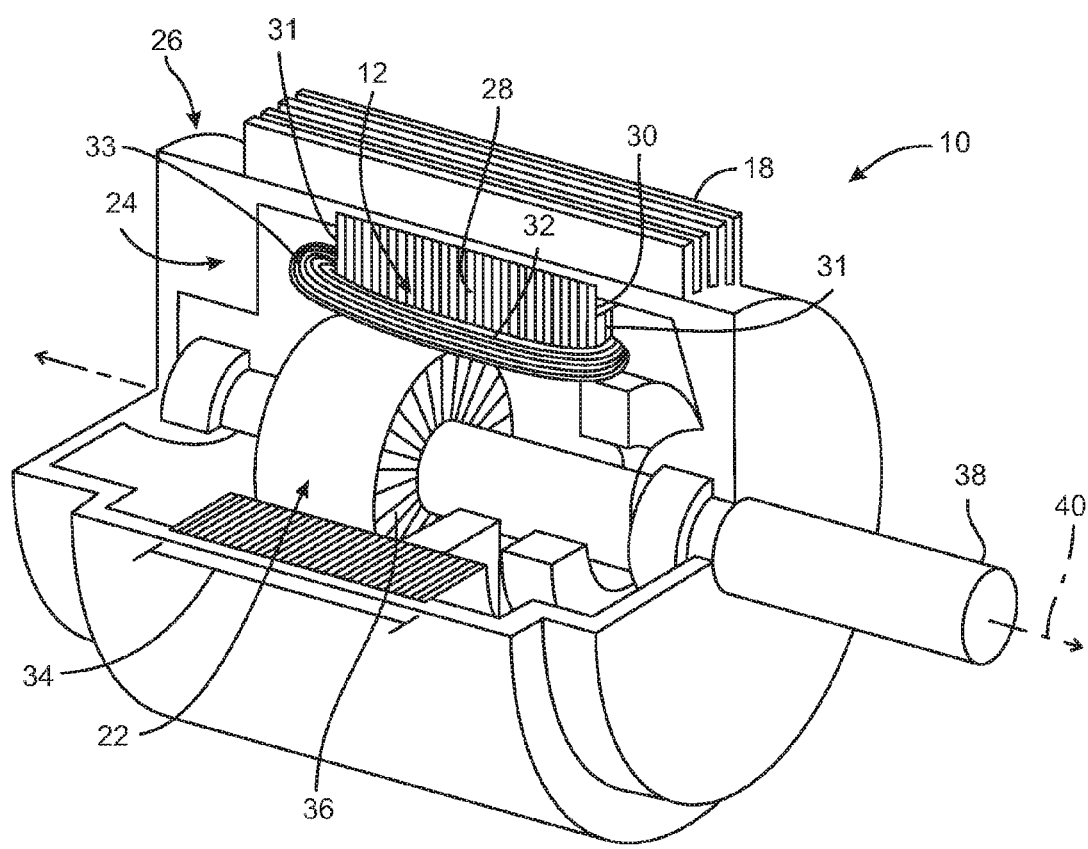
FIG. 1 is a perspective view of a motor embodying the exemplary stator electrical connection management device of the present invention.

FIG. 1 is a perspective cut-away view of an exemplary electric machine 10 that includes a stationary assembly 12. Electric machine 10 also includes a machine assembly housing 18 and a rotatable assembly 22. Machine assembly housing 18 defines an interior 24 and an exterior 26 of machine 10 and is configured to at least partially enclose and protect stationary assembly 12 and rotatable assembly 22. Stationary assembly 12 includes a stator core 28, which includes a plurality of stator teeth or projections 30. End caps 31 are positioned over opposed end teeth of the plurality of stator teeth 30. Wire 33 is wound around stator teeth 30 and the end caps to form each of a plurality of windings or stator electromagnetic coils 32. In an exemplary embodiment, stationary assembly 12 is a three phase salient pole stator assembly. Stator core 28 is formed from a stack of laminations made of a highly magnetically permeable material, and windings 32 are wound on stator core 28 in a manner known to those of ordinary skill in the art. Laminations are stacked such that stator core 28 reaches a predefined length 34. In the exemplary embodiment, the plurality of laminations that form the stator core 28 may be either interlocked or loose laminations. In an alternative embodiment, stator core 28 is a solid core. For example, stator core 28 may be formed from a soft magnetic composite (SMC) material, a soft magnetic alloy (SMA) material, and/or a powdered ferrite material using a sintering process. In another alternate embodiment, the windings 32 are wound around a plurality of spools (not shown), each of which is removably fitted to one of the stator teeth 30.

In one embodiment, rotatable assembly 22 includes a permanent magnet rotor core 36 and a shaft 38 and is configured to rotate around an axis of rotation 40. In the exemplary embodiment, rotor core 36 is formed from a stack of laminations made of a magnetically permeable material and is substantially received in a central bore of stator core 28. While FIG. 1 is an illustration of a three phase electric motor, the methods and apparatus described herein may be included within machines having any number of phases, including single phase and multiple phase electric machines.

In the exemplary embodiment, electric machine 10 is coupled to a fan (not shown) for moving air through an air handling system, for blowing air over cooling coils, and/or for driving a compressor within an air conditioning/refrigeration system. More specifically, machine 10 may be used in air moving applications used in the heating, ventilation, and air conditioning (HVAC) industry, for example, in residential applications using ⅓ horsepower (hp) to 1 hp motors or greater and/or in commercial and industrial applications and hermetic compressor motors used in air conditioning applications using higher horsepower motors, for example, but not limited to using ⅓ hp to 7.5 hp motor or greater. Although described herein in the context of an air handling system, electric machine 10 may engage any suitable work component and be configured to drive such a work component. Alternatively, electric machine 10 may be coupled to a power conversion component, for example, an engine, a wind turbine rotor, and/or any other component configured to rotate rotatable assembly 22 to generate electricity using electric machine 10.

Figure 2:
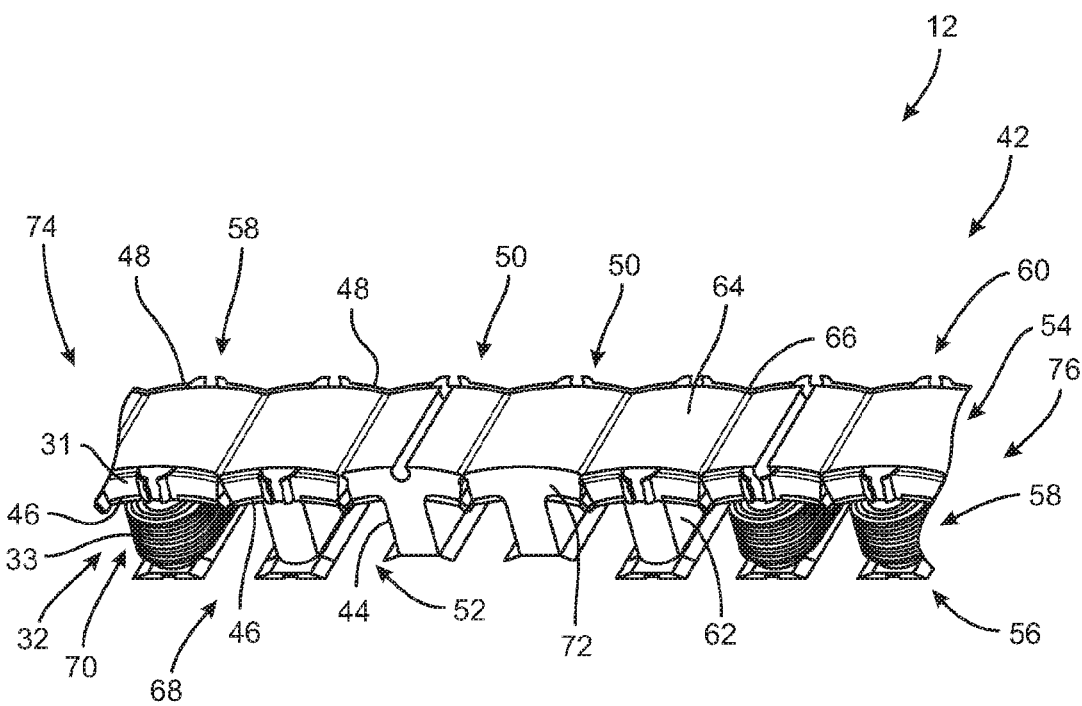
FIG. 2 is a perspective view of a portion of a roll-up stator with portions of the windings removed for use with the motor of FIG. 1 embodying the exemplary stator electrical connection management device.

FIG. 2 is a partial perspective view of an exemplary stator assembly 12 with portions and components removed for clarity. In the exemplary embodiment, a stator assembly 12 is configured for use in, for example, a brushless direct current motor, a permanent magnet alternating current (PMAC) motor, and/or any other suitable electrical machine. In the exemplary embodiment, stator assembly 12 includes a stator core or base 42, a plurality of members or end caps 31, and a plurality of insulation members 44. End caps 31 may include a plurality of first end caps 46 and a plurality of second end caps 48. Stator assembly 12 includes a plurality of stator segments 50. Although illustrated as including twelve stator segments, stator assembly 12 may include any number of stator segments that allows stator assembly 12 to function as described herein. While, as shown the end caps and the insulation members are separate components, it should be appreciated that the end caps may be integral with the insulation members. Further it should be appreciated that the insulation members and/or the end caps may be in the form of a coating placed over the teeth of the stator.

In the exemplary embodiment, each stator segment includes a first and cap 46 and a second end cap 48. Furthermore, in the exemplary embodiment, one of the plurality of insulation members 44 is positioned within a slot 52 defined between adjacent stator segments 50.

Moreover, in the exemplary embodiment, each of the plurality of stator segments 50 includes a yoke assembly 54, a foot assembly 56, and a tooth assembly 58 that extends between the yoke assembly and the foot assembly. For example, third stator segment 60 includes a yoke assembly 54, a foot assembly 56, and a tooth assembly 58 extending there between, Core 42 can be formed as a stack of flat laminations (not shown) made of a highly magnetically permeable material. The plurality of laminations that form core 42 may be either interlocked or loose laminations. In an alternative embodiment, core 42 is a solid core. Core 42 includes a plurality of teeth or projections 62, a plurality of yokes 64, and a plurality of flexible portions 66 configured to enable stator assembly 12 to be arranged annularly. Each tooth 62 extends from a respective yoke 64, and each flexible portion 66 connects adjacent yokes 64.

In the exemplary embodiment, each stator segment includes a tooth assembly and wire wound about the tooth assembly. For example, stator segment 50 includes tooth assembly 58. Wire 33 is wound about tooth assembly 58 between adjacent slots 68. As such, portions of insulation members 44 are positioned between tooth 62 of tooth assembly 58 and winding 70. Each end cap 31 has a substantially similar configuration, described in more detail below. In an alternative embodiment, stator segments 50 may not include end caps 31 as described in more detail below. In the exemplary embodiment, each end cap 31 is positioned between an end face 72 of core 42 and winding 70. While the stator assembly 12 is in the linear arrangement shown, wire 31 is easily wound around teeth 58 of the stator segments 50 to form windings 32. As shown the stator assembly 12 extends from first end 74 to second end 76.

Figure 3:
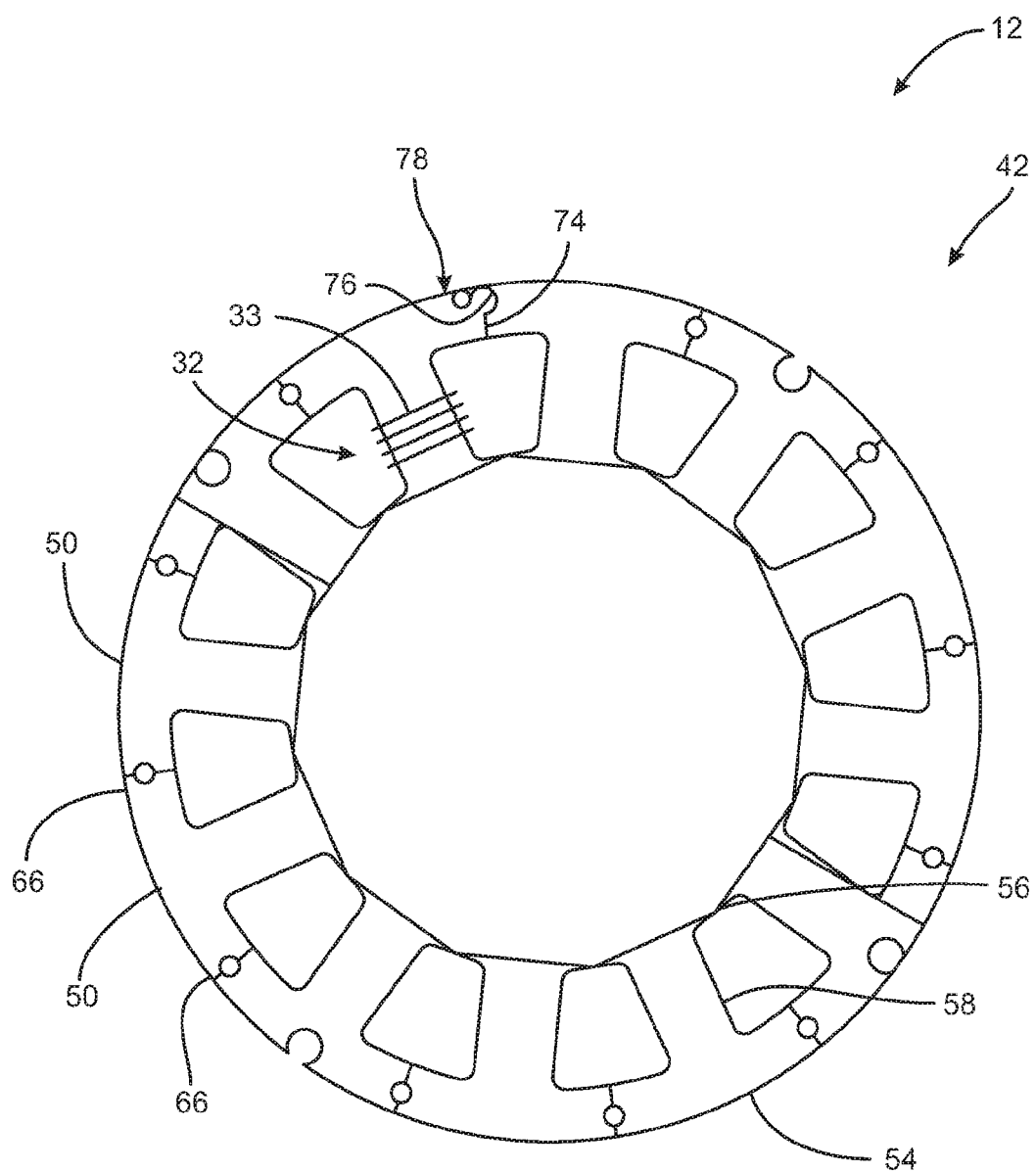
FIG. 3 is a plan view of the roll-up stator of FIG. 2 in a cylindrical or rolled-up configuration.

Referring now to FIG. 3, the stator assembly may be assembled bending the stator core 42 at the flexible portions 66 between adjacent segments 50 and then by connecting first end 74 with the second end 76 of the stator assembly 12 of FIG. 2 to form the cylindrical shape of the stator assembly 12 as shown in FIG. 3. A latch 78 may be used to connect the ends 74 and 76

Figure 4:
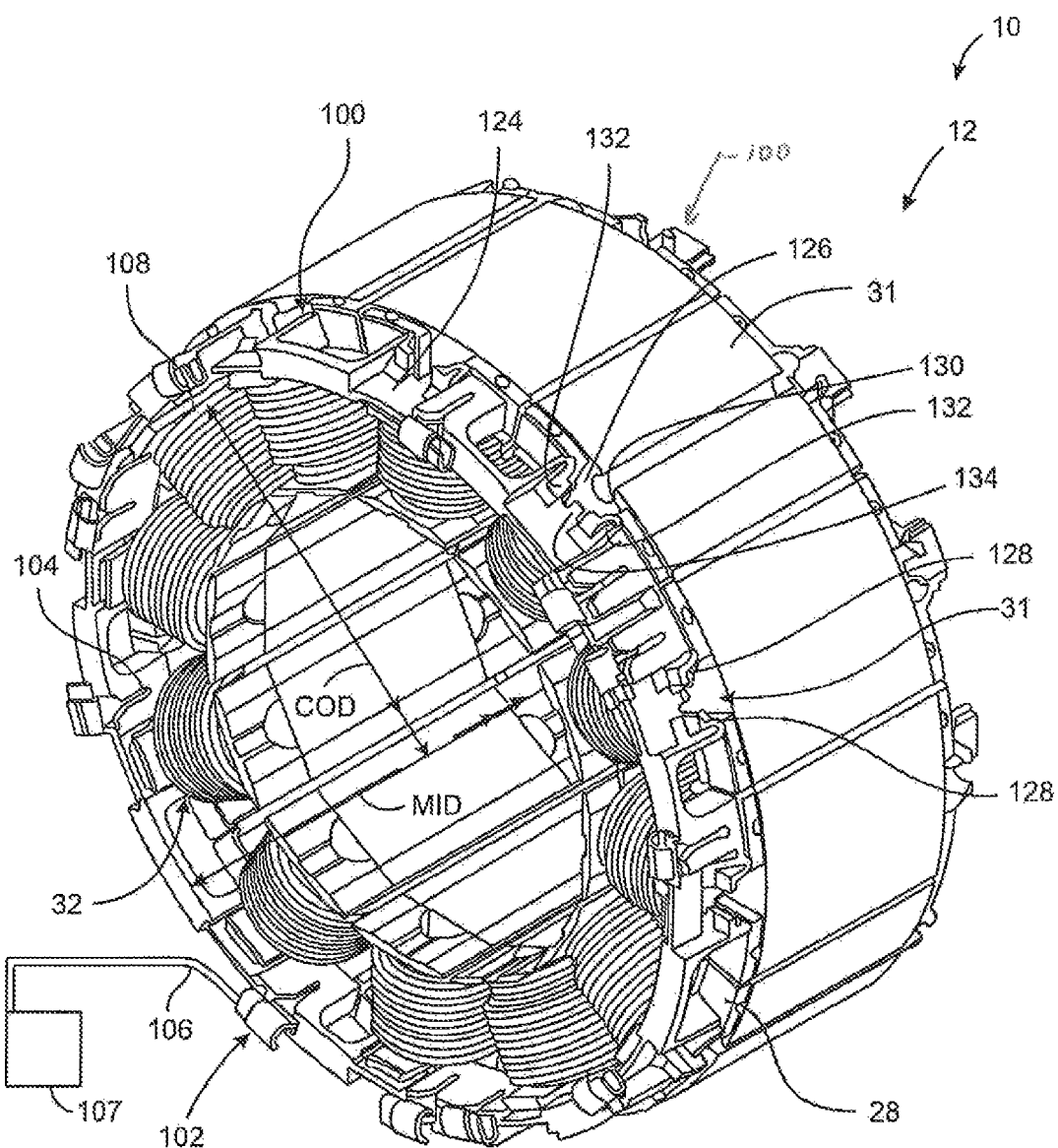
FIG. 4 is a perspective view of the stator of the motor of FIG. 1, embodying the exemplary stator electrical connection management device of the present invention.

Referring now to FIG. 4 a member or holder 100 according to the present invention is shown. The member 100 cooperates with the stator assembly 12 of the machine 10 and is used to support, hold, secure or mount electrical connectors 102 to the machine 10. The electrical connectors 102 connect lead ends 104 of the windings or stator electromagnetic coils 32 to other lead ends 104 of other coils 32 and/or to lead wires 106. Lead wires 106 is used to connect the power source 107 to coils 32.

While the member 100, as shown in FIGS. 1-10, is used with a radial flux motor, it should be appreciated that member according to the present invention may be used in any motor having electrical connectors, lead ends or lead wires, lead harnesses. For example the member may be used on Radial flux PMAC and BLDC, Axial Flux BLDC and PMAC, BLDC and PMAC motors where the stator is contained in the ID of the rotor. Further, the member may be used on Synchronous Reluctance motors of radial, axial, and inside out design.

The member 100 may be positioned anywhere in the vicinity of the coils 32 so that they may support or hold the connectors. Since the connectors connect the lead ends 104 of the coils 32, the member 100 is preferably close or adjacent the coil to minimize the length of the lead ends 104, to minimize current leakage. For simplicity, the member 100 may connected to the coils 32 and may use a portion of the coil 32, for example the inner periphery, the coil face or the outer periphery 108 of the coil to support the member. Alternatively, or in addition, the member 100 may be connected or supported to another portion of the stator assembly 12, for example the stator core 28 or the end caps 31. As shown the member 100 cooperates with the end caps 31 to be properly positioned in the electric machine 10, which will be described in greater detail below.

While the member 100 may hold a portion of the electrical connectors 102 with other connectors (not shown) being used to supplement the electrical connections necessary for proper operation of the electric machine 10, for simplicity, the member 100 supports all the electrical connectors that are required for the machine to interact with all the coils 32 of the machine 10. For example and as shown, typically, one lead end 104 extends from each coil 32. Electrical machines utilize a variety of numbers of electromagnetic stator coils, including 4, 6, 8, 12, 24 and other combinations. As shown, the electric machine has twelve coils 32 with one lead end 104 extending from each of the twelve coils. To connect the 12 lead ends, for simplicity the machine 10 uses 12 connectors. As shown the member 100 supports these 12 connectors, but it should be appreciated that the member may support fewer or more connectors.

Figure 5:
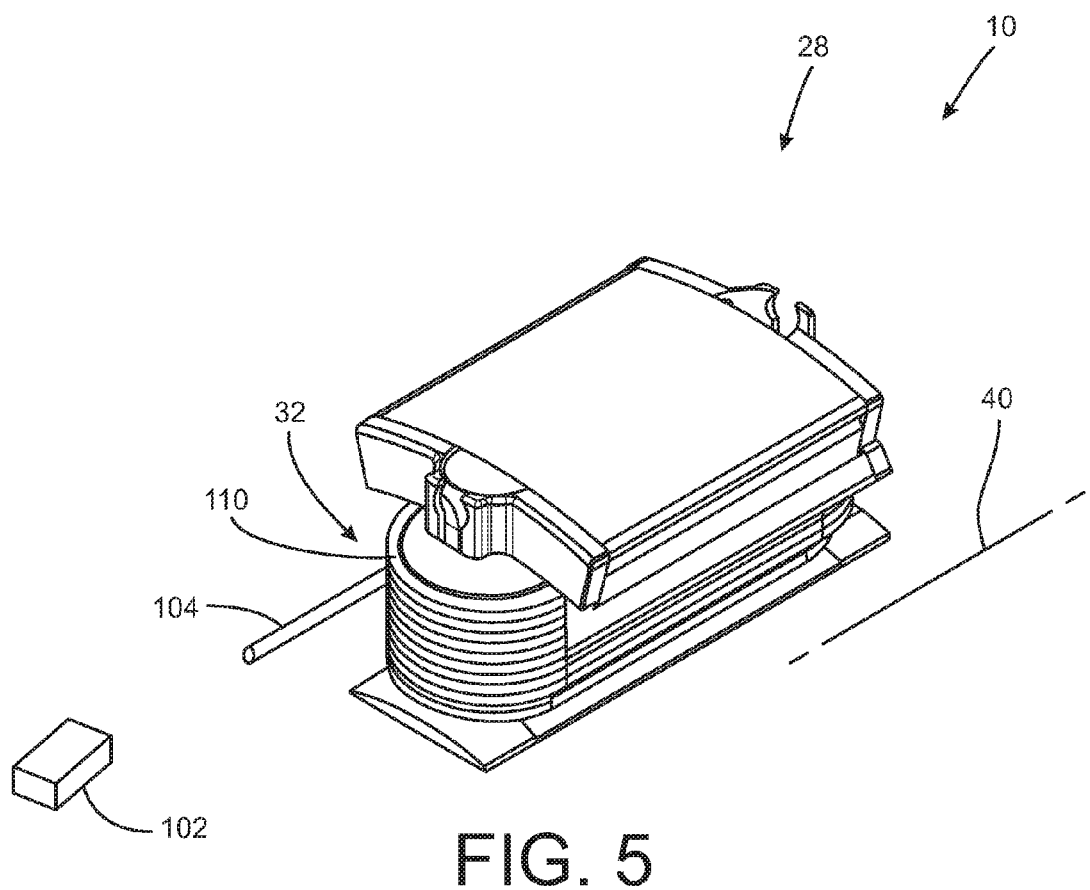
FIG. 5 is a perspective view of an end cap for a stator winding of an electric motor that includes an end cap that may engage the exemplary stator electrical connection management device of FIG. 1.

Referring now to FIG. 5, a coil 32 is shown in greater detail. The lead end 104 extends from end 110 of coil 32 in a direction parallel to rotational axis 40 of the machine 10. Therefore to most simply install the electrical connectors 102 to the machine 10, the electrical connectors 102 would be advanced to a position adjacent the lead end 104 in a direction parallel to rotational axis 40 of the machine 10 toward the lead end 104 of coil 32.

Referring again to FIG. 4, 12 electrical connectors 102 are each positioned in alignment with one of the lead ends 104, such that advancing the member with the electrical connectors installed in the member with simultaneously position all 12 connectors 102 adjacent the lead ends 104 of the coils 32. It should be appreciated that alternatively the electrical connectors 102 could be installed onto the lead ends 104 individually and then the member 100 would be aligned with the connectors 102 to fit the connectors 102 into the member 100.

Figure 6:
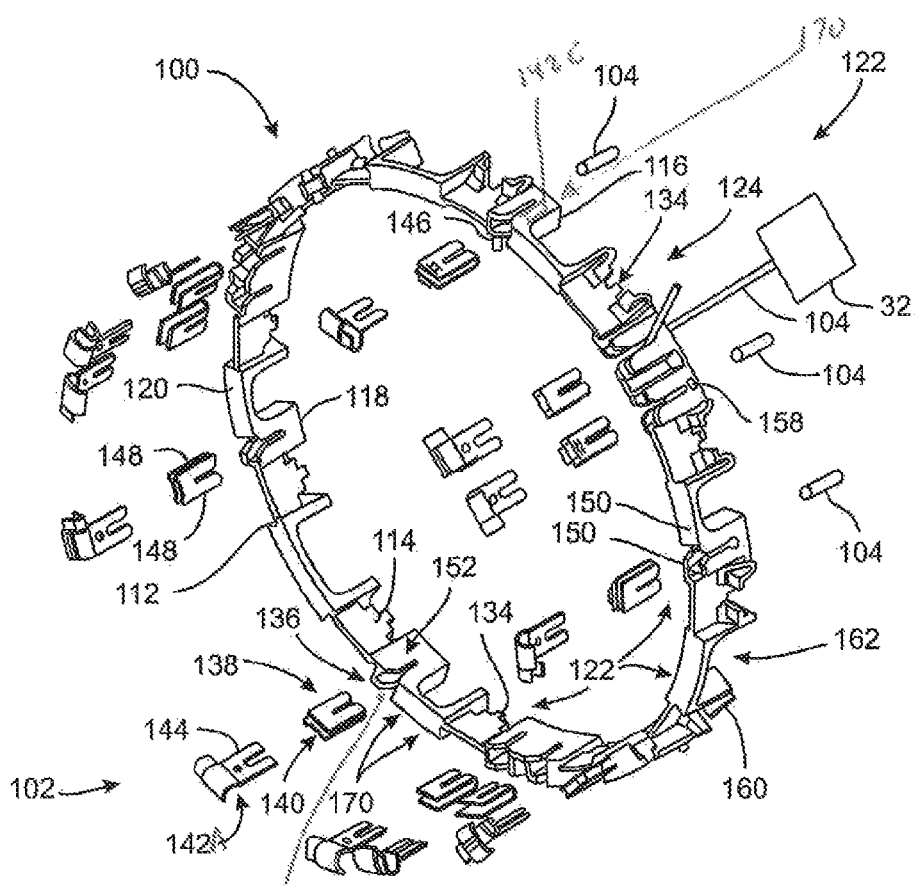
FIG. 6 is an exploded perspective view of the exemplary stator electrical connection management device assembly for use in the stator of the motor of FIG. 1.

Referring now to FIG. 6, four of the lead ends 104 are shown in axial alignment with the member and with the connectors to illustrate how the member 100 may be used to align and install the connectors onto the lead ends 104 of the coils 32.

As shown the member 100 is designed for use with an insulation displacement type connector (commonly known as a IDC connector). An insulation displacement type connector removes the insulation from the end of a coated wire while the wire is being inserted into the connector. Such a connector is available from Tyco Electronics Corporation, Berwyn Pa. It should be appreciated that the member of the present invention may be used with any connector whether of an insulation displacement type or not. Further, it should be appreciated that the member of the present invention may be used whether the connector is able to be inserted axially onto the member or not and whether the lead end 104 of coil 32 is able to be inserted in the connector 102 by an axial movement of the member or not. It should be appreciated, however that the ability to axial install the member with all the connectors at once and to strip the insulation off the coil or magnet wire while installing is advantageous.

Referring again to FIG. 6 the member 100 is shown in greater detail. As shown the member 100 preferably has a generally hollow cylindrical shape to correspond to the generally hollow cylindrical shape of a stator assembly. The member 100 is defined by body 112 having an inner periphery 114, an outer periphery 116 and opposed inward side and outward side end faces 118 and 120, respectively. The member 100, as shown, includes a mounting feature 122 operably associated with said body and adapted for mounting the body 112 onto the stator 12. At stated above, the feature 122 may be merely the inner periphery 114, the outer periphery 116, or one of the faces 118 and 120.

As shown in FIG. 4, the coils 32 define a coil generally circular outer periphery COD and the inner periphery 114 of member 100 define a generally circular inner periphery MID. As shown the coils 32 fit within the inner periphery 114 of member 100 and the coils serve to provide a mounting feature for the member 100.

While the circular outer periphery COD and the circular inner periphery MID may be sufficient to contain the member 100, as shown the member 100 may further include a member location feature 124. The member location feature 124 cooperates with an end cap location feature 126 located on end cap 31.

While the circular outer periphery COD and the circular inner periphery MID may be sufficient to center the member 100 in the motor, the member location feature 124 and the end cap location feature 126 serve to properly angularly orient the member 100 such that the connectors 102 align with the lead ends 104. It should be appreciated that the member may be used without the angular orientation feature by manually aligning the connectors 102 with the lead ends 104. The angular and radial alignment of the member 100 with the coils 32 and the remaining portions of the electric machine 10 may provide for the level of accuracy necessary to automate the assembly of the machine, particularly the automation of placing the lead wires 106 in the machine. The member 100 may include location features (not shown) particularly designed to facilitate automation and to connect and/or register to robotic or conventional automation equipment.

Referring to FIG. 6, the member location feature 124 is in the form of a slot formed into the member 100 and extending axially inward from inward side end face 118 of member 100. The slot 124 has opposed axially extended side faces 128.

Referring to FIG. 4, the end cap location feature 126 is in the form of a protrusion extending from end face 130 of end cap 31. The protrusion 126 has opposed axially extending side faces 132.

As shown in FIG. 4, the opposed axially extending side faces 132 of protrusion 126 engage the opposed axially extended side faces 128 of slot 124 to angularly secure the member to the stator assembly 12 of the machine 10. A locking tab 134 extents outwardly from the member 100 centrally positioned over the slot 124 and engages the protrusion 126 to lock the member 100 to the end cap 31. A sufficient fit of the faces 132 of protrusion 126 to the side faces 128 of slot 124 and/or a sufficient fit of the circular outer periphery COD to the circular inner periphery MID may obfuscate the need for the locking tab 134.

To axially position the member 100 relative to the stator assembly 12, the inward side end face 118 of member 100 seats against the end face 130 of end cap 31. It should be appreciated that other features of the member 100 and other feature of the stator assembly 12 may be used to properly position the member 100 in the machine 10.

Referring again to FIG. 6, the member 100 serves to receive electrical connectors 102. While as stated above the electrical connectors 102 may have any shape or form capable of connecting a lead end 104 of a stator coil 32 to another lead end 104 or to a lead wire 106.

Figure 7:
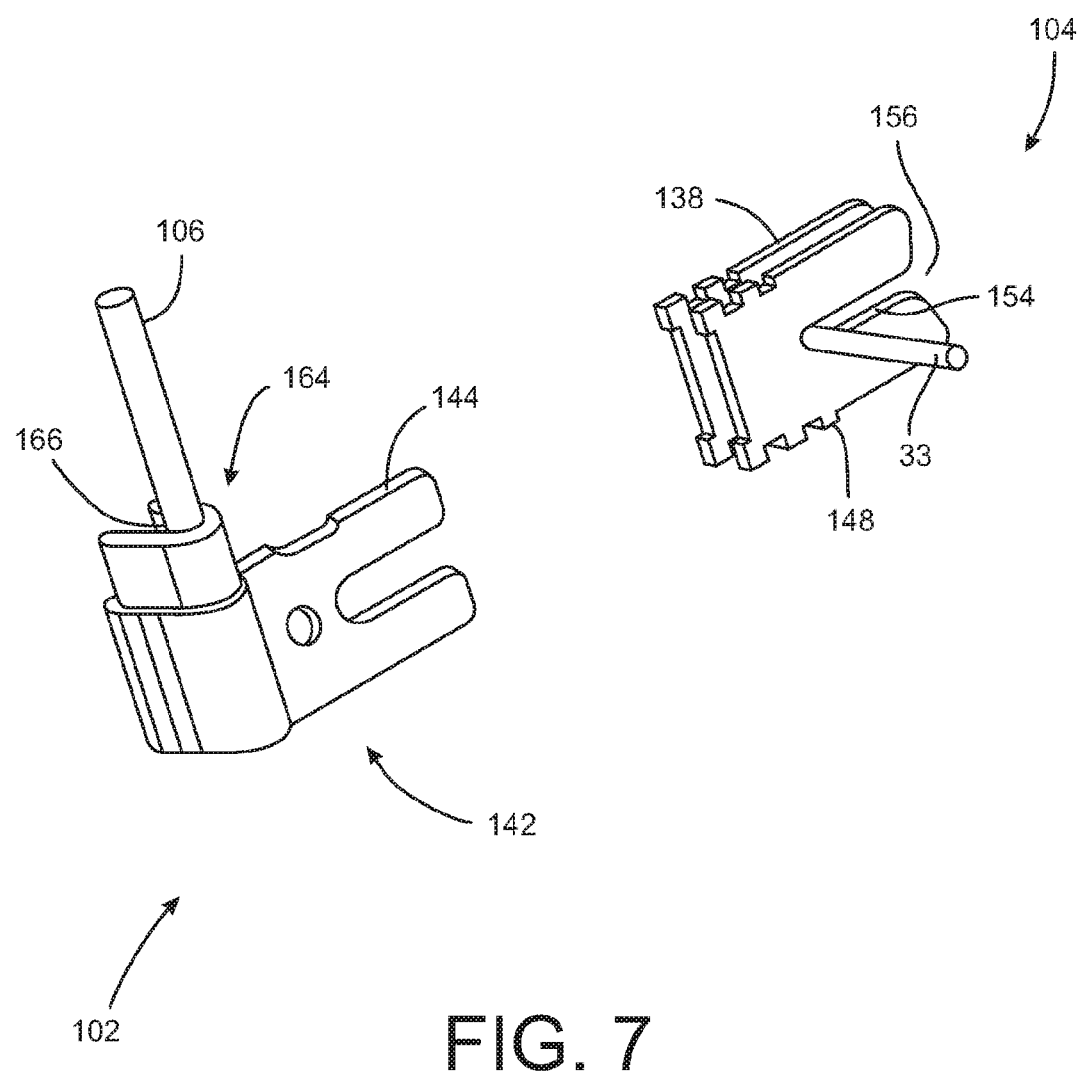
FIG. 7 is an exploded perspective view of the electrical connector of the exemplary stator electrical connection management device assembly of FIG. 6.

Referring now to FIG. 6 and FIG. 7 and as shown, the electrical connectors 102 are IDC connectors having a U-shaped end 138 with a central opening 140 and a split spade shaped end 142 with a flat connecting end 144 that is sized to fit into the opening 140 of end 138. As shown the member 100 includes receptacles 136 for receiving a portion of U-shaped end 138 of connector 102. The receptacle 136 has a generally rectangular pocket 146 into which the U-shaped end 138 of connector 102 matingly fits. While component sizing to provide a sufficient fit of the end 138 of connector 102 in pocket 146 may adequately secure the connector 102 in pocket 146, as shown the U-shaped end 138 of connector 102 may include opposed barbs 148 that engage opposed internal walls 150 of pocket 146.

To assist in connecting the lead ends 104 of the coils 32 to the connector 102, the member 100 may assist in locating the lead ends 104 as they extend from the coil 32 to the connector 102. For example, the receptacles 136 may include features for positioning the lead ends 104 of wire 33 to connect to the electrical connectors 102.

To remove the insulating coating from the end of the coated wire 33 of the lead ends 104 of the coils 32 while the wire 33 is being inserted into the connector, the wire 33 of the lead ends 104 is placed in mating central slot 152 of pocket 146. The U-shaped end 138 is then inserted into pocket 146 with parallel sides 154 of central slit 156 formed in U-shaped end 138 engaging the wire 33 and removing the coating. When the U-shaped end 138 is fully seated in pocket 146, U-shaped end 138 engages anvil 158 of pocket 146 and shears off any excess length of the wire 33. The central slot 152 of pocket 146 is a feature for positioning the lead ends 104 of wire 33 to connect to the electrical connectors 102.

Features for accommodating extra lead wire 106 and magnet wire 33 can be incorporated into the member. For example and as shown in FIG. 6, bridges 160 located between pockets 146 and slots 124 can provide passageways 162 for the lead wire 106 and magnet wire 33.

Figure 6A:
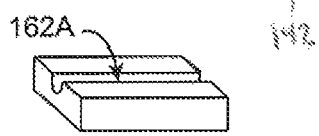
FIG. 6A is a perspective view of an embodiment of a wire management feature for use with the stator electrical connection management device of the present invention.
Figure 6B:
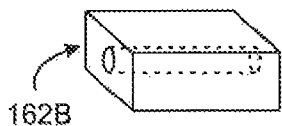
FIG. 6B is a perspective view of an another embodiment of a wire management feature for use with the stator electrical connection management device of the present invention.
Figure 6C:
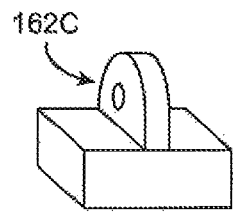
FIG. 6C is a perspective view of an another embodiment of a wire management feature for use with the stator electrical connection management device of the present invention.
Figure 6D:
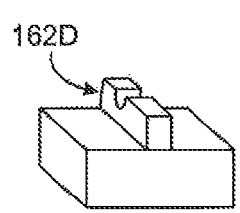
FIG. 6D is a perspective view of an another embodiment of a wire management feature for use with the stator electrical connection management device of the present invention.
Figure 6E:
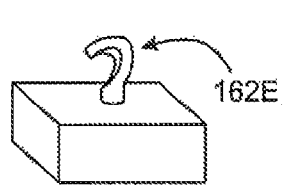
FIG. 6E is a perspective view of an another embodiment of a wire management feature for use with the stator electrical connection management device of the present invention.
Figure 6F:
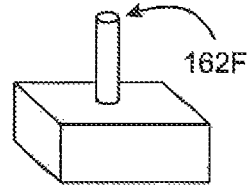
FIG. 6F is a perspective view of an another embodiment of a wire management feature for use with the stator electrical connection management device of the present invention.

Alternatively channels 162A (see FIG. 6A), tunnels 162B (see FIG. 6B), closed tabs 162C (see FIG. 6C), open tabs 162D (see FIG. 6D) hooks 162E (see FIG. 6E) and pin 162F (see FIG. 6F) can be added to the member to help secure and manage lead wire 106 and magnet wire 33. These features, particularly the closed tabs 162, open tabs 162D, hooks 162E and pin 162F, could protrude downwardly toward the coils 32 (see FIG. 6) and beyond the inward side face 118 of body 112 of member 100. These features may be used to hold and guide wires (not shown) which may be positioned beyond the inward side face 118 of body 112 of member 100.

Referring again to FIG. 7, the split spade shaped end 142 of the electrical connector 102 has an opening 164 for receiving stripped end 166 of lead wire 106 or magnet wire 33.

Referring now to FIG. 8, one of the lead wires 106 is shown with the split spade shaped end 142 of the electrical connectors 102 connected to the stripped end or stripped portion 166 of wire 106 to form a lead harness 168. The lead harness 168 also includes additional split spade shaped end 142 connected to the stripped end 166 of wire 106 and as shown has three stripped portions 166 with one of three split spade shaped ends 142 attached at each stripped portion 166. The lead harness is thus configured for connecting the harness 168 to three U-shaped ends 138 of the electrical connectors 102 mounted in receptacles 136 of member 100. One U-shaped end 138 is connected to each split spade shaped end 142.

Referring now to FIGS. 8 and 8A, the lead harness 168 has a first length A between adjacent split spade shaped ends 142 and a second length B between adjacent split spade shaped ends 142. The lead harness 168 and its lengths A and B are designed to matingly correspond to the positions or lengths A' and B' of the three U-shaped ends 138 of the electrical connectors 102 mounted in receptacles 136 of member 100 so that lead wire length is minimized and such that assembly is simplified and made less likely for lead harnesses to be connected improperly or to become entangled in the rotating components of the machine 10.

Referring now to FIG. 9, a kit 201 embodying an aspect of the subject invention is shown. The kit 201 serves to provide a first set X of components for converting the machine 10 to, for example a series connection to a series parallel connection. Such a conversion may be possible by merely changing the lead wire connections and the lead end connections to the various coils and the power supply. For example and is shown in FIG. 9, the kit 201 includes the first set X of components having a first ring shaped member or first shaped holder 200X and a first set 268X of lead harnesses. The kit 201 also includes the second set Y of components having a second ring shaped member or second ring shaped 200Y and a second set 268Y of lead harnesses. When the power supply and the lead ends 104 of the coils 32 are connected with the first set X of components, for example, the motor 10 may have a series connection. Conversely, when the power supply and the lead ends 104 of the coils 32 are connected with the second set Y of components, for example, the motor 10 may have a series parallel connection.

In this kit for converting the machine 10 from a series connection to a series parallel connection, the first set 268X of lead harnesses and the second set 268Y of lead harnesses would be different. However, first ring shaped holder 200X and second ring shaped holder 200Y may be physically identical. Preferably, the first ring shaped holder 200X and second ring shaped holder 200Y would have different indicia on them so to guide in the proper wire harness placements.

However, in this kit for converting the machine 10 from either a series connection or a series parallel connection, the first set 268X of lead harnesses and the second set 268Y of lead harnesses would still be different. However, first ring shaped holder 200X and second ring shaped holder 200Y would be physically different. The first ring shaped holder 200X and second ring shaped holder 200Y would preferably also have different indicia on them so to guide in the proper wire harness placements.

Referring again to FIG. 6, the member 100 may include indicia 170, placed in any fashion, for example, molded formed stamped or taped onto any portion of the member 100. For example the indicia 170 may be placed on outward side face 120 of the body 112 of member 100. The indicia serves to provide information to the machine assembler to connect the proper electrical connectors 102 to the proper lead ends 104 and the proper lead wires 106 and to properly assemble the proper member 100 in the proper angular orientation to provide a motor with the proper configuration, e.g. a three phase 440 Volt motor by acting to associate a specific electrical connector with one or more specific lead wires.

Referring again to FIGS. 6 and 8, the indicia 170 on member 100 may be coordinated or matched with indicia 171 on the lead harnesses 168 and/or on lead wires 106 so that the proper mounting location of the lead harnesses 168 and the lead wires 106 on the member. For example, end 142A of harness 168 may have indicia 168 in the form of number 142A and one pocket 146 may have indicia 170 in the form of number 142A, so that end 142A will be inserted into that particular pocket 142.

Figure 10:
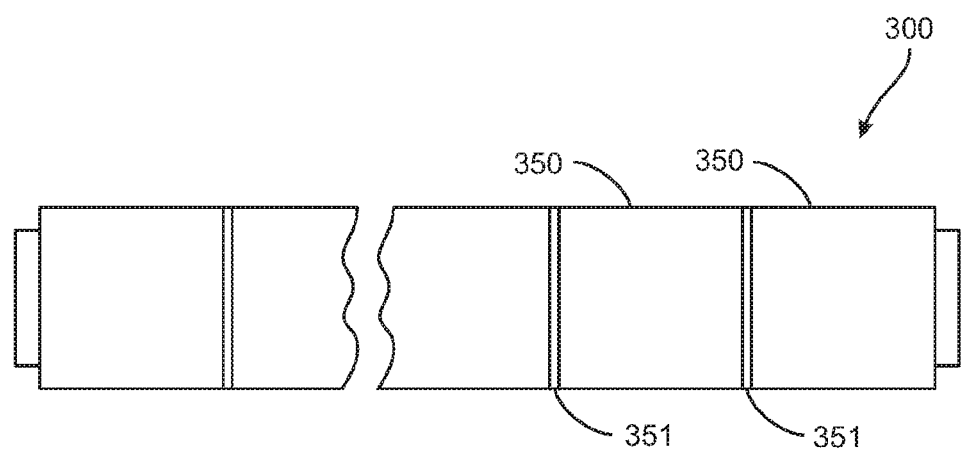
FIG. 10 is a top view of another exemplary stator electrical connection management device of the present invention with hinges between device segments.

While the member 100 may be in the form of a ring as shown in FIGS. 1-8, the member of the present invention may have any form to cooperate with the stator assembly to assist in properly securing the lead wires and the lead ends of the electrical machine. For example and as shown in FIG. 10, a member 300 may be utilized according to an embodiment of the present invention. The member 300 includes a plurality of member segments 350, each segment corresponding to one of the stator segments 50 of stator core 28 (see FIG. 2). The member segments 350 may be secured to the corresponding stator segment 50. The member segments 350 may be coupled to each other by, for example, a hinge 351, for example, an integral mechanical hinge or a separate component. For example and as shown in FIG. 10, the member 300 may be made of a polymer or composite and the hinges 351 may be living hinges and may be integrally molded with the member 300. The member 300 may be well suited for use with the stator core 28 shown in FIG. 2, and the member 300 may be attached to core 28 when the core is linearly arranged as shown in FIG. 2.

Figure 5A:
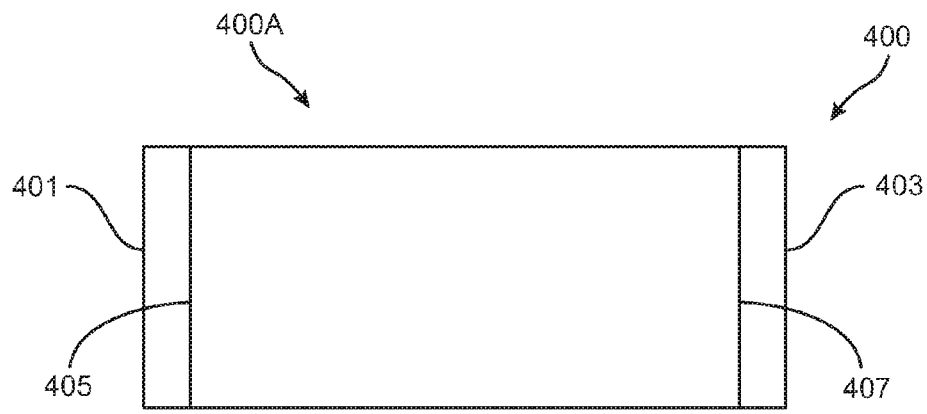
FIG. 5A is a top view of another exemplary stator electrical connection management device of the present invention with connectable device segments.

While the member 100 may be in the form of a ring or be formable into a ring, the member may be assembled from a series of separate components. For example and as shown in FIG. 5A the member may be in the form of member 400, which is combined with other members 400 to form member assembly 400A. Each of the individual members or member segments 400 may, as shown, corresponds to one of the stator segments 50 of stator core 28 (see FIG. 5) and may be attached thereto by a connection mechanism (not shown). The member segments 400 may include connecting features 401 and 403 at opposed ends 405 and 407 of the member segments 400 for connecting the member segments 400 to form member assembly 400A.

The member 100 of FIGS. 1-7 may be made of any durable material and is preferable made of an electrically non conductive material so that it should not electrically conduct and wire it guides and electrically active component to which it is near for example the coils 32. The member may be made of a polymer or a composite or any other non conductive material. The member may be manufactured by any possible process, such as by forming, by casting, by machining or by stamping.

Figure 11:
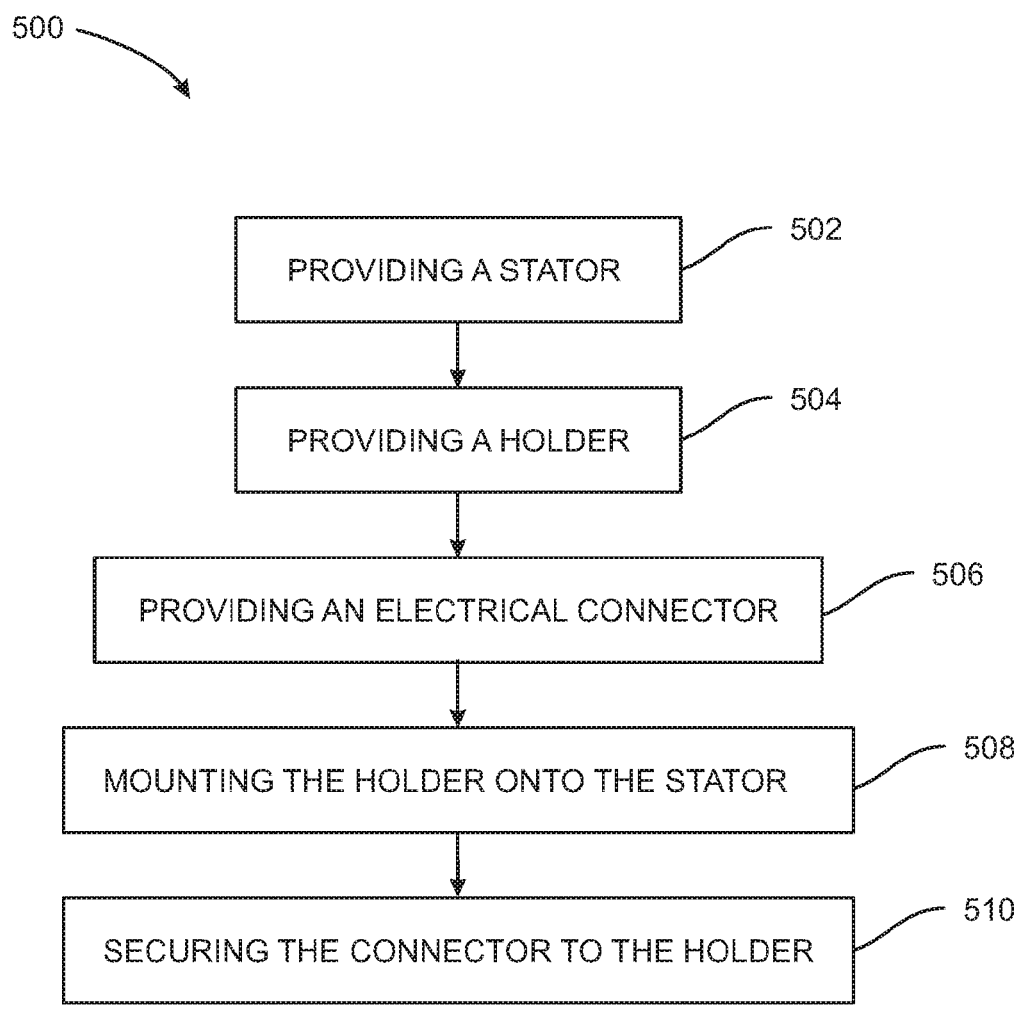
FIG. 11 is a flow chart of an exemplary method for assembling the electric motor shown in FIG. 1.

Referring now to FIG. 11, a flow chart of an exemplary method 500 for assembling an electric machine 10 (see FIG. 1). The method 500 includes providing 502 a stator 12 (see FIG. 4) and providing 504 a holder 100 (see FIG. 4). The method 500 also includes providing 506 an electrical connector 102 (see FIG. 4). The method 500 also includes mounting 508 the holder onto the stator. The method 500 also includes securing 510 the connector to the holder.

The method 500 may also provide for securing the connector to the holder prior to mounting the holder onto the stator.

The method 500 may also provide for either securing the connector to the holder or mounting the holder onto the stator robotically, by machine or automatically.

The methods, systems, and apparatus described herein facilitate efficient and economical assembly of an electric motor. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An assembly for cooperation with the stator of an electric machine, for providing electrical connection thereto and for adapting the stator for use with a selected one of series connection and a series parallel connection, said assembly comprising:

a first holder, said holder including a mounting feature operably associated with said holder and adapted for mounting said first holder onto the stator and a plurality of circumferentially disposed receptacles operably associated with said first holder, said holder first including first indicium connected to the body and corresponding to use with the series connection;

a second holder, said second holder including a mounting feature operably associated with said second holder and adapted for mounting said second holder onto the stator and a plurality of circumferentially disposed receptacles operably associated with said second holder, said holder second including second indicium connected to the body and corresponding to use with the series parallel connection;

a first set of lead harnesses, said first set of lead harnesses adapted for use with the parallel connection, said first set of lead harnesses including indicia connected thereto and corresponding to use with the series connection; and a second set of lead harnesses, said second set of lead harnesses adapted for use with the second power source, said second set of lead harnesses including indicia connected thereto and corresponding to use with the series parallel connection; and an electrical connector connected to said holder at the receptacle, wherein said receptacle is adapted for receiving said electrical connector.

2. An assembly in accordance with claim 1, wherein said holder comprises a hollow holder having an inner periphery and an outer periphery.

3. An assembly in accordance with claim 1:

wherein the stator has a plurality of stator coils;

wherein each of said plurality of receptacles corresponding to one of said plurality of stator coils; and further comprising a second connector.

\* \* \* \* \*